United States Patent [19]

Hallock et al.

[11] 4,137,764

[45] Feb. 6, 1979

[54] VORTEX ADVISORY SYSTEM

[75] Inventors: James N. Hallock, Waltham; Edward A. Spitzer, Natick; William D. Wood, Sudbury, all of Mass.

[73] Assignee: The United States of America as represented by the Secretary of Transportation, Washington, D.C.

[21] Appl. No.: 833,501

[22] Filed: Sep. 15, 1977

[51] Int. Cl.² .................................... G01W 1/02
[52] U.S. Cl. .......................... 73/178 T; 73/189; 364/439
[58] Field of Search ............. 73/178 T, 189; 364/439, 364/440, 441, 461

[56] References Cited

U.S. PATENT DOCUMENTS

| 3,936,663 | 2/1976 | Taylor et al. | 364/551 |
| 4,011,752 | 3/1977 | Fowler | 73/189 |
| 4,043,194 | 8/1977 | Tanner | 73/178 T |

Primary Examiner—Herbert Goldstein
Attorney, Agent, or Firm—Herbert E. Farmer; Harold P. Deeley, Jr.; Otto M. Wildensteiner

[57] ABSTRACT

The separation between aircraft approaching a common runway is minimized by measuring the existing wind conditions at a preselected point relative to the runway threshold and basing a prediction of the movement of wake vortices on the measured conditions. The prediction of vortex movement is based upon a vortex advisory algorithm prepared from a plot of wind conditions which predictably remove vortices from the flight path.

12 Claims, 5 Drawing Figures

VORTEX ADVISORY SYSTEM

ORIGIN OF THE INVENTION

The invention described herein was made by an employee or employees of the United States Government and may be manufactured and used by or for the Government for governmental purposes without payment of any royalties thereon or therefor.

BACKGROUND OF THE INVENTION (1) Field of the Invention

The present invention relates to determining the appropriate spacing between fixed-wing aircraft arriving at runways so as to permit the minimum separation commensurate with safe operation as a function of the atmospheric conditions. More specifically, this invention is directed to a vortex advisory system which will enable flight controllers to vary the separation between aircraft as a function of the accurately predicted motion of wake vortices produced by the aircraft. Accordingly, the general objects of the present invention are to provide novel and improved methods and apparatus of such character.

(2) Description of the Prior Art

Aircraft generating lift create a pair of counterrotating cylindrical air masses known in the art as wake vortices. In a homogeneous quiet atmosphere the vortex pair will descend to an altitude of about half a wingspan above the ground and then the individual vortices will separate and move apart roughly parallel to the ground. However, in the presence of winds, the vortices are convected. Thus, the self-induced motion of the vortices near the ground may be cancelled by the motion which would be attributable to the surface wind thus resulting in the stalling of a wake vortex generated by a first aircraft in the flight path of a following aircraft.

The phenomenon of aircraft wake vortices has been known since the beginning of powered flight, but the potential dangers associated with encountering wake vortices has only recently become apparent. An aircraft which inadvertently encounters a vortex can be subjected to rolling moments exceeding the roll control capability. A dangerous loss of altitude or structural failure can also result. The chance of a vortex encounter is, of course, greatest at airport terminal areas where numerous aircraft will be following the same flight path in approaching the terminal and aircraft on approach have little time and altitude to recovery from the effects of a vortex encounter. The potentially disastrous results incident to an unexpected wake vortex encounter are greatest in those areas where light and heavy aircraft operate in close proximity.

In order to prevent aircraft-vortex encounters, the Federal Aviation Administration has established separations between aircraft, based on aircraft type, which are greater than those which testing has indicated as being the minimum required for vortices to decay in strength to a point where they are no longer harmful or for vortices to move laterally away from the flight path of a following aircraft. These separations, however, decrease the capacity of the airport system. In an effort to increase the capacity of operation into high density air terminals, by reducing approach separation times, resort has been had to two diverse approaches. On the one hand, considerable research has been conducted on methods to hasten the demise of vortices at the source by modifying aircraft through the use of devices such as wing spoilers, mass injectors, wing-tip modifications and the deployment of trailing devices. Conversely, significant attention has been directed to means for reliably locating and tracking vortices. Such tracking means are exemplified by the apparatus disclosed in U.S. Pat. No. 3,693,015 and have been characterized by a lack of predictive capability and the need for complex specifically designed hardware.

A further problem facing flight controllers; i.e., a task in addition to instructing the aircraft under his control to maintain a specific spacing depending on aircraft type, lies in the requirement that the aircraft crew be advised of wind direction and speed. At the present time the controller must refer to moving needle-type instruments and must mentally integrate the movements of the instrument pointers over a period of, for example, one minute. The information transmitted to the flight crew is thus average wind speed and direction, measured at only one point on the airfield, and transient conditions such as wind gusts will enter into the mental calculation of the average. The potential for inaccuracy is obvious and is increased by the fact that there can be substantial variation in the average wind conditions such as, for example, between landing and take-off runways.

SUMMARY OF THE INVENTION

The present invention overcomes the above briefly described and other deficiencies and disadvantages of the prior art by providing a novel technique and system for predicting the movement and life expectancy of vortices for the existing meteorological conditions. The present invention is based upon the discovery that there are wind conditions which predictably remove vortices. Specifically, the present invention comprises a vortex advisory system designed to take advantage of a wind criterion which is used to determine the required separations. The invention contemplates comparing the measured wind magnitude and direction with respect to each runway heading with the established wind criterion. Wind criterion refers to the winds measured with respect to the landing aircraft (headwind, crosswind); therefore, the term "wind criterion" is applicable to any and all runways.

Apparatus in accordance with the present invention utilizes conventional meteorological instruments to provide information which is processed to predict vortex motion and hence safe aircraft separations. In accordance with a preferred embodiment, a network of towers are deployed around an airport to accurately measure wind speed and direction in the operating corridors. The measured wind parameters are processed in such a manner as to determine mean wind speed and direction and wind gust values. Thereafter, using the wind criterion in the form of a vortex advisory algorithm, one of a plurality of standard separations between aircraft is determined. Thus, in accordance with the invention, measured wind parameters and a vortex advisory algorithm are employed to determine safe aircraft separations to thereby optimize runway usage.

The present invention also contemplates displaying safe aircraft separation as well as the processed mean wind parameter data to flight control personnel.

BRIEF DESCRIPTION OF THE DRAWINGS

The present invention may be better understood and its numerous objects and advantages will become apparent to those skilled in the art by reference to the accompanying drawings wherein.

DESCRIPTION OF THE PREFERRED EMBODIMENT

As noted above, the present invention is based upon the discovery that there are wind conditions which predictably remove vortices. These wind conditions may be plotted, in the form of a wind criterion, and used to determine when the separations between arriving aircraft can be uniformly reduced to three nautical miles for all aircraft types rather than using the three-, four-, five-, and six-mile separations currently required. The method of the present invention includes comparing the measured wind magnitude and direction, with respect to each runway heading, with the plotted wind criterion.

To first consider the meteorological instrumentation in accordance with a hardware implementation of the present invention, a network of instrumented towers will be placed around the airport in order to measure the wind conditions existing in each approach corridor. In a typical installation there will be one meteorological tower per runway end. A tower is indicated schematically at 10 in FIG. 1. It has been found desirable to measure the wind conditions in a region where a vortex usually stalls and thus, again considering a typical installation, the tower 10 will be positioned approximately 2000 feet from the end of the runway, proceeding outwardly from the runway threshold, and will be off-set approximately 1000 feet from the runway center line. The off-set is mandated by the fact that the tower must be positioned where it will not be hit by the vortex as this would cause inaccurate readings. It has also been found desirable to measure the wind conditions at a height of 50 feet above the ground since tests have also shown that wake vortices will conventionally settle to equilibrium at approximately this altitude.

Figure 1:
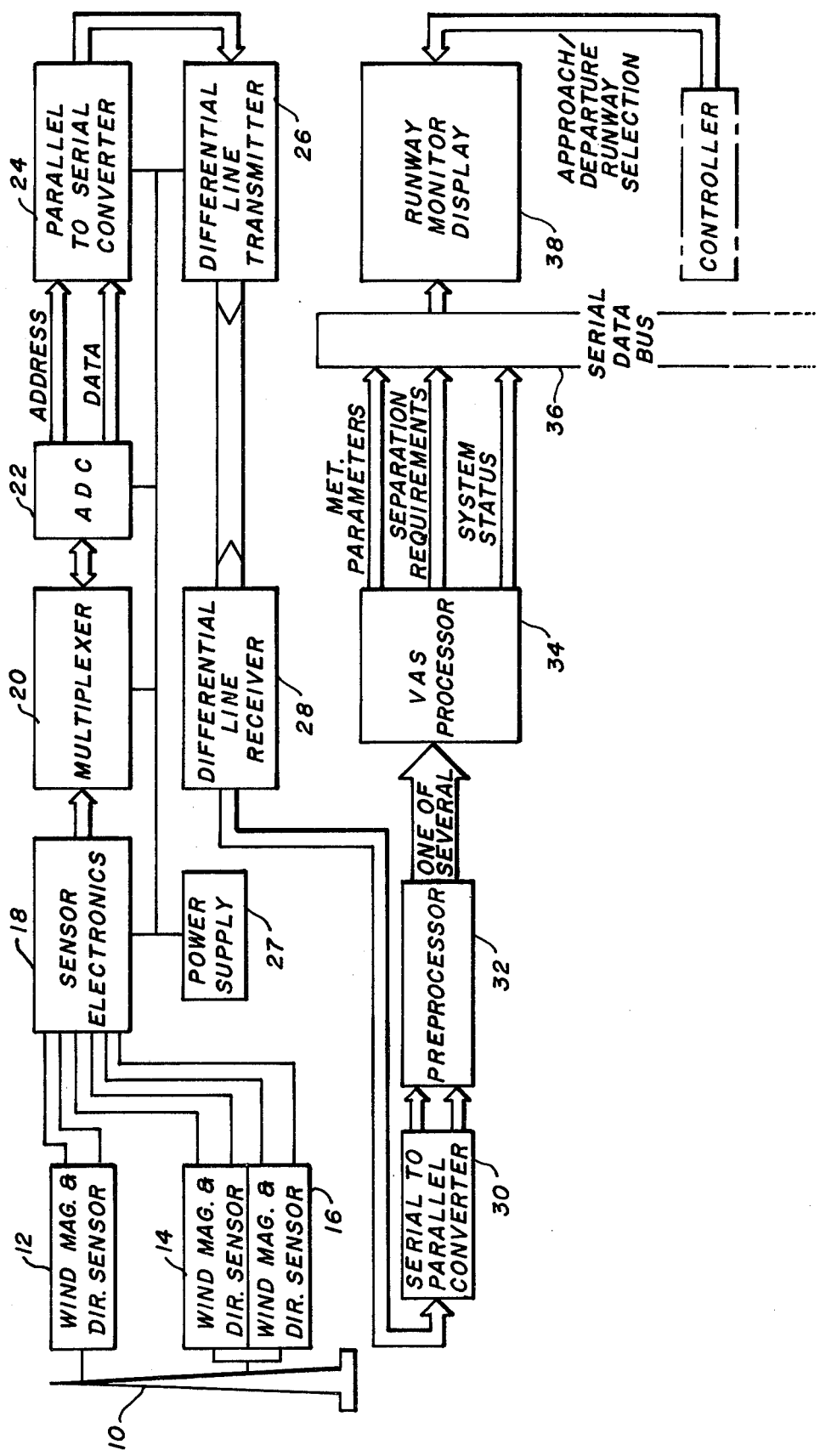
FIG. 1 is a functional block diagram of a vortex advisory system in accordance with the present invention.

As depicted in FIG. 1, each of towers 10 is provided with a plurality of wind magnitude and direction sensors whereby redundant measurements of the direction and magnitude of the wind may be made. Tower 10 is shown as including a first magnitude and direction sensor 12 positioned at the 50-foot level and a second pair of magnitude and direction sensors 14 and 16 located on opposite sides of the tower, so as to provide a measurement undisturbed by tower shadowing, at the 47-foot level. All of sensors 12, 14 and 16 may comprise a conventional cup-type anemometer and vane or a conventional aerovane. Thus, no specially designed sensors are required in accordance with the present invention. All three sensors may, alternatively, be located at the same level if relatively positioned to avoid any "shadowing".

The electrical output signals commensurate with measured wind magnitude and direction, as provided by each of sensors 12, 14 and 16, are delivered to a wind magnitude and direction sensor electronics package 18, located at the tower, which includes appropriate noise filters, amplifiers, converters, and scalers. The six output signals from the electronics package 18, corresponding to the wind magnitude and direction measured by each of the three sensors, are successively sampled by a multiplexer 20. Multiplexer 20 may be a single-ended analog multiplexer which scans through a selected number of channels at a preselected rate. The output of multiplexer 20 is delivered to an analog-to-digital converter 22 which digitizes the data appearing on each channel with, for example, twelve-bit accuracy. The data bits are combined with four bits of channel information to form, in the example being described, sixteen-bit words. These sixteen-bit words are serialized by a parallel-to-serial converter 24 and transmitted, by means of a differential line transmitter 26, over a two-wire cable to a central processing station. The modem comprising converter 24 and transmitter 26 determines the scanning rate of multiplexer 20; i.e., the multiplexer scans the six data channels from tower 10 at the modem transmit rate. In accordance with one reduction to practice of the invention, multiplexer 20 and analog-to-digital converter 22 comprised a Datel Systems' Model DAS-16 L12B2A1B-EX. The modem 24–26, in the same reduction to practice, comprised a Larse Corporation Model LSC-111-5440 which operates in a line-switching mode at a crystal controlled 5440-Hz bit rate. All of the tower sensor and data processing circuitry is operated from a power supply 27 located at the tower site. Thus, the only connection between the tower and the central processing station comprises the two lines by which the sampled wind magnitude and direction data are transmitted.

The data from each tower, as transmitted by differential line transmitter 26, are received at the central processing station by means of differential line receivers such as receiver 28. The differential line receivers, in the reduction to practice mentioned above, comprised a Larse Corporation Model LCR-111-5440. The receivers each included a serial-to-parallel converter 30 which converts the serial bit stream into parallel sixteen-bit words. The sixteen-bit words, which change at a rate commensurate with the channel scanning rate of multiplexer 20, are sequentially applied to the input of a preprocessor 32. There will be a separate preprocessor 32 for each of the meteorological towers. Preprocessors 32 each comprise a microprocessor with both read-only and random-access memories. The microprocessors sample the meteorological data output from the serial-to-parallel converters 30 at a preselected rate such as, for example, two samples per second. The sampled wind magnitude (R) and wind direction ($\theta$) are used to compute a one-minute running average for the wind magnitude ($\overline{R}$) and direction ($\overline{\theta}$). This is accomplished by computing $U = R \cos \theta$ and $V = R \sin \theta$ for each sample, computing $\overline{U}$ and $\overline{V}$ using a running 128-sample average and finally computing $\overline{R} = (\overline{U}^2 + \overline{V}^2)^{\frac{1}{2}}$ and $\overline{\theta} = TAN^{-1} (\overline{V}/\overline{U})$. The preprocessors also determine wind gust magnitude employing a 30-second interval. Within each 30-second interval the sampled wind velocity is averaged using a four-sample running average. Momentary peaks due to high frequency gusts, which would not affect aircraft operations, are filtered out by the four-sample running average. Any measured peak must be at least nine knots above $\overline{R}$ to be considered a gust. The gust value is the peak value observed during each 30-second interval. At the end of each 30-second interval the gust value is compared to the gust value observed during the previous 30-second interval and the larger of the two is displayed in the manner to be described below. Any microcomputer such as the Intel Corp. SBC 80/20 microcomputer may be used to process the Vortex Advisory System (VAS) tower data. The SBC 80/20 contains 8K of Read Only Memory (ROM) and 2K of Random Access Memory (RAM).

Figure 4:
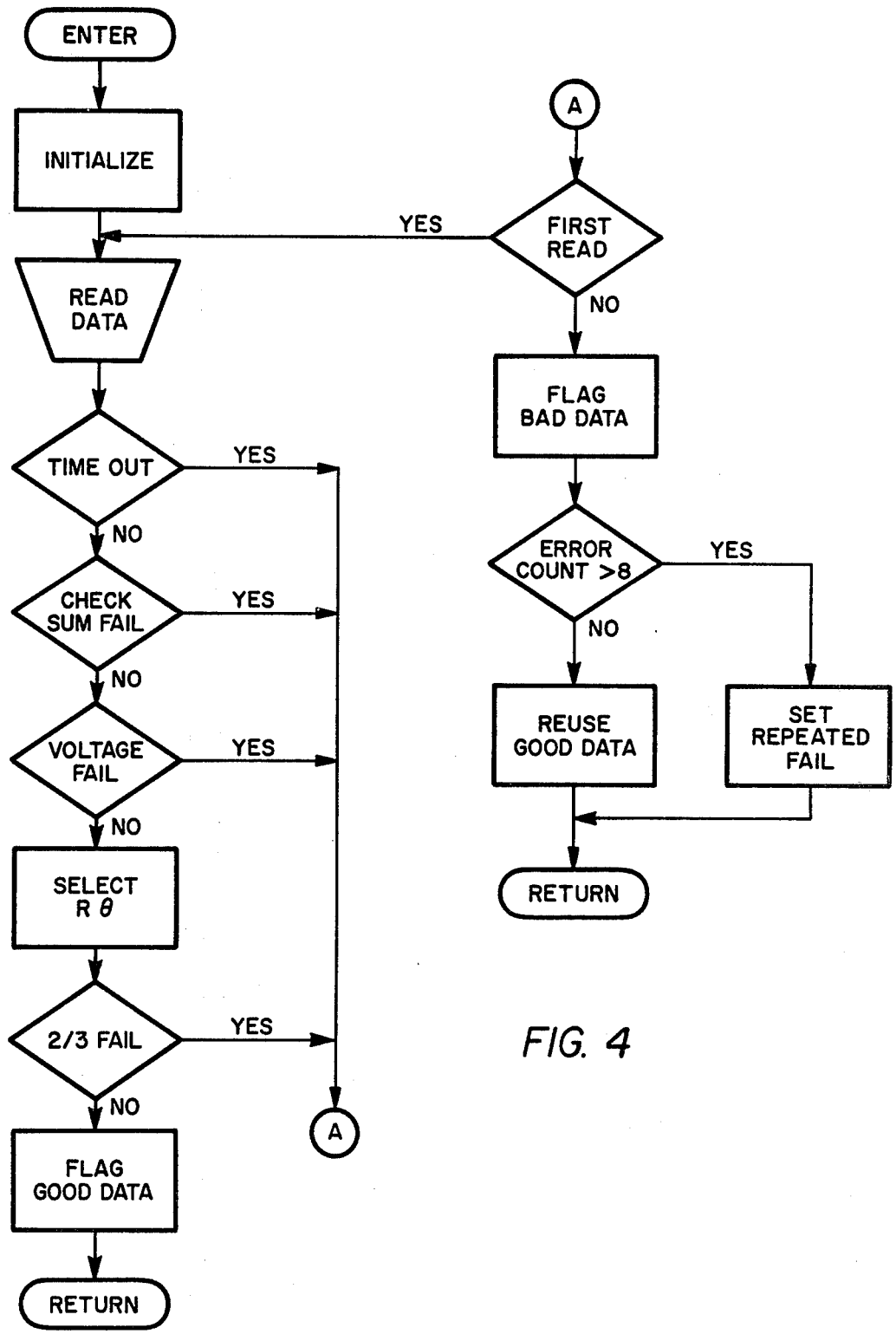
FIG. 4 is a flow chart showing the microprocessor program subroutines for the tower data.
Figure 5:
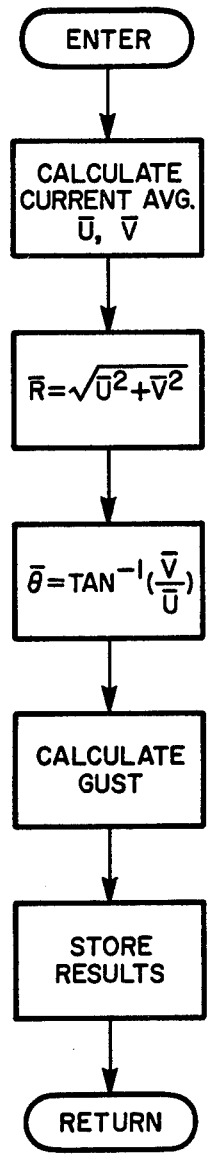
FIG. 5 is a flow chart showing the microprocessor program subroutines to provide the average values of wind speed and direction and any observed gusts.

The R and $\theta$ information from the three sensors on each tower are compared in their respective preprocessors 32 after each sampling interval. A sensor failure bit is generated if the wind velocity information provided by any sensor differs by more than three knots from that of the other sensors or if the directional information from any sensor differs by more than 20° from that provided by the other two sensors on the same tower. Normally, the fifty-foot sensor data are used for the vortex advisory system algorithm. If the fifty-foot sensor output fails, the microprocessor switches automatically to a forty-seven foot sensor and selects the sensor which is not in the shadow of the tower. A failure of at least two sensors to agree terminates all data output from that tower. Upon detection of a failure, a failure word is generated identifying the sensor which has failed or, if two sensors disagree, a failure word is generated to identify a tower which has been shut down. The preprocessors may, for example, comprise a microprocessor such as an Intel Corporation Model 8080A connected to 8K of read-only memory and 8K of random-access memory by common address and data buses. The read-only memory contains the instructions required for the microprocessor to perform the following sub-tasks:

(a) Output reduced data;
(b) Sample and store new data;
(c) Sensor failure detection and correct data selection;
(d) Coordinate conversion;
(e) Averaging of $U$ and $V$;
(f) Compution of $\overline{R}$ and $\overline{\theta}$; and
(g) Gust computation. Sub-tasks (c)–(g) comprise the internal processing of the meteorological data. The microprocessor program subroutine "GET TOWER DATA", FIG. 4, first checks the incoming data from the tower sensors 12, 14, 16 to determine if there are any gaps (Time Out), if all channels have been read (Check Sum) and if voltage levels in the tower electronics power supplies are correct (Voltage Fail). Any errors encountered during the reading are stored. If there is an error, the error count is incremented. Eight consecutive error readings are considered a permanent error. Sensor failure detection and correct data selection are accomplished by comparing $R_1$, $R_2$, $R_3$ samples of wind speed from the three sensors on the associated tower. If they are all within 3 knots the fifty-foot value is selected. If only 2 are within 3 knots of each other, the lower value is selected. If no agreement can be found a 2-out-of-3 failure bit is set and the "averaging" is continued using the previously selected value for two seconds. If the 2-out-of-3 failure does not correct itself within two seconds, the tower is shut down. When the average wind magnitude exceeds 5 knots, wind direction samples $\theta_1$, $\theta_2$, $\theta_3$, obtained from the three sensors on the tower, are compared. If the wind direction samples are within 20° of each other the fifty-foot value is selected. If only two meet the comparison test, the average value of the two readings is selected unless $\theta_1$ is one of the two values in which case $\theta_1$ is selected. If none are acceptable, a 2-out-of-3 failure bit is set, and the previously selected $\theta$ value is used for "averaging" for two seconds. If the 2-out-of-3 failure does not correct itself within two seconds, the tower is shut down. For cases when the average wind magnitude is less than 5 knots the minimum difference among $\theta_1$, $\theta_2$ and $\theta_3$ is sought and the intermediate value of wind direction, between the two sensors exhibiting the minimum difference, is selected.

The subroutine "PROCESS SENSOR DATA" shown in the accompanying flow chart determines the average values of wind speed and direction $\overline{R}$ & $\overline{\theta}$, and any observed gusts. In coordinate conversion the selected values of R and $\theta$ are converted to cartesian coordinates (U, V). For example $R = 10$ knots, $\theta = 45°$ (Northeast) becomes $U = +7$ and $V = +7$. U, V values are produced at the sampling rate of the tower data preprocessor. 128 values are stored in a FIFO file in the microprocessor read-write random access memory.

In sub-task (e), at each $\frac{1}{2}$-sec interval, averaging is performed on the 128 samples of U, V.

In sub-task (f), at each $\frac{1}{2}$-sec interval, the averaged value of U, V is converted back to $\overline{R}$, $\overline{\theta}$ (polar coordinates).

In sub-task (g), again at each $\frac{1}{2}$-sec interval, a 4-sample averaged R is compared with the $\overline{R}$ of the previous half second. If the averaged 4-sample R is greater than or equal to 9 knots more than the $\overline{R}$, it is saved as a gust candidate. If the gust candidate is larger than a previous or current gust value, the gust candidate is declared the gust value. The new gust value will remain the gust value for 1 minute, unless it is surplanted by a new gust value. After a gust value is retained for 1 minute, either a new gust value is promoted or the gust value is set to zero.

Following the gust computation, the tower data preprocessors go into a wait state awaiting a next interrupt signal.

Figure 3:
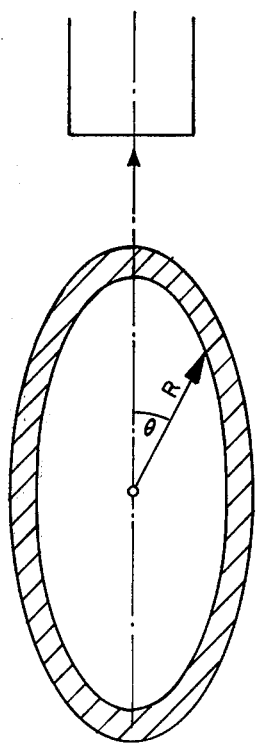
FIG. 3 is a graphical representation of the wind criterion on which the present invention is based.

The output data from the preprocessor in each channel is delivered to a vortex advisory system main data processor 34. Processor 34 also comprises a microprocessor with both random-access and read-only memories. Microprocessor 34 is used to calculate the allowable aircraft landing separations for a runway based on the wind speed and direction measured by the instrument tower 10 associated with that runway. Referring to FIG. 3, an elliptical vortex advisory algorithm, which includes a buffer or "transition zone", is employed. The major and minor axes of the inner and outer ellipses are 12 and 5.5 knots and 14 and 7.5 knots respectively. The transition zone allows for a gradual change between states. As will be obvious to those skilled in the art, an air traffic controller working a line of approaching aircraft could obviously not accommodate an abrupt change in required separations. The criterion for separation and for changing separations are:

(a) If the wind factor ($\overline{R}$, $\overline{\theta}$) is inside the inner ellipse, the standard 3-4-5-6 mile separations apply and the controller will be provided with a readily observable visual ("red") indication that such standard separations must be maintained.

(b) If the wind factor ($\overline{R}$, $\overline{\theta}$) is outside the inner ellipse, all aircraft can be separated by three miles regardless of the type of aircraft leading or following and a "green" condition exists.

(c) If the condition is "red" and the wind is increasing, the requirement exists for the wind factor to be outside the outer ellipse for one minute before the "green" condition will be displayed. If the wind factor remains in the buffer zone the "green" condition is displayed along with the "red" condition indicator which is flashed for each of the 0.5-second intervals during which the wind factor is in the transition zone.

(d) If the condition is "green" and the wind starts decreasing and enters the transition or buffer zone, the "green" condition remains in effect on but the "red" condition indicator will be flashed for each of the 0.5-second intervals during which the wind factor is in the transition zone. This provides the controller with an indication that a possible change to "red"; i.e., standard separations; may occur.

The processor 34 outputs "labeled" data commensurate with the meteorological parameters, separation requirements and system status to a common data bus 36. The meteorological parameters which are outputed include average wind direction $\bar{\theta}$, average wind speed $\bar{R}$ and gust velocity. These data are delivered to bus 36 for each of the meteorological towers at the airfield.

The orientations of the runways at the terminal are stored in the memory associated with the main vortex advisory system processor 34. The stored program for processor 34 accepts the $\bar{R}$, $\bar{\theta}$ data from the preprocessors 32, redefines the wind direction $\theta$ to that of the runway axis and determines the wake vortex status condition. The vortex advisory algorithm of FIG. 3 is also stored in the memory unit associated with microprocessor 34. Processor 34 functions, as described above, so as to output information to the data bus 36 which is connected to a runway monitor display 38; the display being addressed by microprocessor 34.

Figure 2:
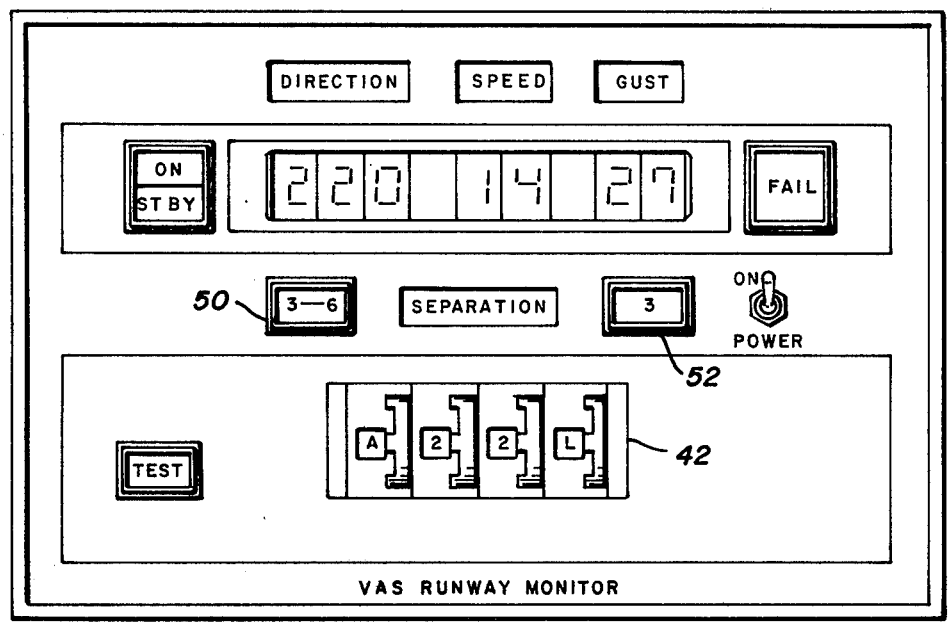
FIG. 2 is a plan view of a display device which may be employed with the embodiment of the invention represented in FIG. 1.

A typical runway monitor display is depicted in FIG. 2. The flight controller may interact with runway monitor display 38, as indicated schematically on FIG. 1, to select the runway of interest. Four characters, selected by means of respective thumb wheel switches mounted in a selector switch housing 42 as depicted in FIG. 2, define the runway selection. Arrivals or departures are selected by the "A" and "D" positions of the first switch. The runway number is selected on the two intermediate switches and the choice of left "L", right "R" or no designation is made with the last thumb wheel switch.

Selection of a valid runway causes the current wind direction relative thereto to be displayed on the runway monitor under the legend DIRECTION, the current average wind speed to be displayed under the legend "SPEED" and the magnitude of the current gusts, if present, to be displayed under the legend "GUST". Heading is displayed in degrees while speed and gusts are indicated in knots. Matrices of light emitting diodes may be employed to display the numerical data. At the center of the panel a pair of vortex advisory indicators 50 and 52 are provided at opposite sides of a decal or plate bearing the legend "SEPARATION". The indicator to the left of the legend, indicator 50, will typically be a red light labelled "3-6" which when illuminated advises that normal spacing; i.e., three to six miles depending on aircraft mix, be maintained for arriving aircraft on the selected runway. The indicator to the right of the legend, indicator 52, will typically be a green light labelled "3" which advises, when energized, that three-mile spacing may safely be maintained between all arriving aircraft on the selected runway. The panel is also provided with an "ON/STBY" lighted switch which may be employed to enable and disable the numerical meteorological data and a "FAIL" light which indicates a failure of the meteorological tower supplying data on the selected runway. When the "FAIL" light is on, numerical wind data are blanked.

As will be obvious to those skilled in the art, display 38 includes control modules which provide an interface between the serial data stream on data bus 36 and parallel data buses which enable the quasi-static display. Data and clock signals outputed from microprocessor 34 arrive at the control modules as differential pairs. The clock signal will pass through a line receiver and will be employed to generate sequential timing pulses. The data signal will also pass through a line receiver and will be loaded into a shift register. In the manner known in the art, and as will be briefly discussed below, the data are thereafter sequentially delivered to the drivers for the appropriate displays.

Data delivered to the control modules in runway monitor display 38 are accompanied by a 4-bit address. The address information indicates the identity of the tower from which the data which will appear next on the data bus 36 have been derived. This identification or address is compared with the runway selection information inserted by the flight controller through manipulation of the thumb wheel switches 42 on the runway monitor display. If a match occurs, a gate will be set to enable passage of the data. If no match occurs, the data associated with the address will be inhibited. If there is a match, the display module will be ready to receive the wind magnitude, direction and gust data as well as the "red-green" separation data. These data will be clocked sequentially into driver circuitry for the actual light-emitting display devices. This driver circuitry, in the case of LED display integrated circuits, will contain a holding register for each numeral, a character generator, refresh circuitry and drive circuit. The "red-green" bits are stored in two latches which provide drive control for indicators 50 and 52.

While a preferred embodiment has been shown and described, various modifications and substitutions may be made thereto without departing from the spirit and scope of the invention. By way of example, the functions of preprocessor 32 and VAS processor 34 can be performed by a single microprocessor. Also, while the disclosed embodiment is designed for use in controlling landing traffic, while providing wind condition information for transmission to departing aircraft, it is expected that the invention will be applicable to providing separation control information for departing aircraft merely by changing parameters of the vortex advisory algorithm. Accordingly, it is to be understood that the present invention has been described by way of illustration and not limitation.

What is claimed is:

1. A method of predicting the motion of aircraft generated wake vortices including the step of:
   measuring the wind magnitude and direction at a point displaced from but juxtapositioned to an operating corridor along which a plurality of aircraft will serially pass;
   plotting the wind conditions which predictably remove vortices from the corridor, the plotted wind conditions defining an elliptical wind criterion:

comparing the measured wind magnitude and direction with the plotted wind criterion; and providing an indication that separation of aircraft traveling in the corridor may be reduced below standard values when the measured wind magnitude and direction with respect to the axis of the corridor lie outside of the plotted wind criterion.

2. The method of claim 1 wherein the step of measuring the wind magnitude and direction comprises:

redundantly measuring the wind velocity and heading; and computing an average wind velocity and heading over a preselected sampling period.

3. The method of claim 2 wherein the step of redundantly measuring wind velocity and heading comprises:

taking plural measurements of the wind velocity and heading at said point;

selecting ones of the plural measurements of wind velocity and heading; and repetitively sampling the selected measurements over the sampling period.

4. The method of claim 1 further comprising the steps of:

repetitively measuring the wind magnitude over a predetermined sampling period;

selecting the maximum wind magnitude measured during the sampling period; and displaying the selected maximum wind magnitude as wind gust information.

5. The method of claim 3 further comprising the steps of:

comparing the selected measurements of wind velocity over a predetermined period; and displaying the maximum wind velocity measured during the preselected period as wind gust information.

6. The method of claim 3 wherein the step of selecting comprises:

comparing the redundant measurements of velocity and heading; and terminating the prediction process when the comparison indicates a difference between measurements exceeding predetermined velocity or heading parameters.

7. The method of claim 5 wherein the step of selecting comprises:

comparing the redundant measurements of velocity and heading; and terminating the prediction process when the comparison indicates a difference between measurements exceeding predetermined velocity or heading parameters.

8. The method of claim 1 further comprising the steps of:

observing the wind magnitude over a time period; and providing an indication of possible change in separation requirements if the wind magnitude is increasing or decreasing when the magnitude exceeds the elliptical criterion by less than a preselected value.

9. The method of claim 7 further comprising the steps of:

observing the wind magnitude over a time period; and providing an indication of possible change in separation requirements if the wind magnitude is increasing or decreasing when the magnitude exceeds the elliptical criterion by less than a preselected value.

10. A vortex advisory system comprising:

means for measuring wind velocity and direction at a point displaced from but juxtapositioned to an operating corridor along which a plurality of aircraft will serially pass;

means for storing information commensurate with predetermined wind conditions which will predictably remove aircraft generated wake vortices from the operating corridor, the stored information consisting of a vortex advisory algorithm corresponding to a wind criterion corresponding to the said predetermined conditions;

means for comparing the measured wind parameters with the stored information and generating an output signal indicative of whether the measured parameters are within or without the wind criterion; and means responsive to the output signal generated by said comparing means for providing an indication of the predicted motion of wake vortices in the operating corridor.

11. The apparatus of claim 10 wherein said measuring means comprises:

a meteorological tower;

a plurality of wind direction sensors mounted on said tower, said direction sensors redundantly providing output signals commensurate with wind heading;

a plurality of wind magnitude sensors mounted on said tower, said magnitude sensors redundantly providing output signals commensurate with wind magnitude;

means for repetitively sampling said signals commensurate with wind magnitude and heading;

means responsive to the sampled wind magnitude and heading signals for selecting signals provided by single direction and magnitude sensors;

means responsive to the wind magnitude and heading signals provided by the selected sensors for averaging said selected sensor signals over predetermined sampling periods; and means for delivering said averaged wind magnitude and heading signals to said comparing means.

12. The apparatus of claim 11 wherein said comparing means comprises:

computer means, said computer means including a program memory and a volatile memory, said computer means outputting information to said indication providing means commensurate with average wind magnitude and direction, wind gust magnitude, the relationship of the instantaneous wind parameters to the stored wind criterion and whether the wind magnitude is increasing or decreasing.

* * * * *